May 18, 1965 J. W. SMITH 3,184,546
FACSIMILE COINCIDENCE PHASING CONTROL CIRCUIT
Filed May 31, 1962
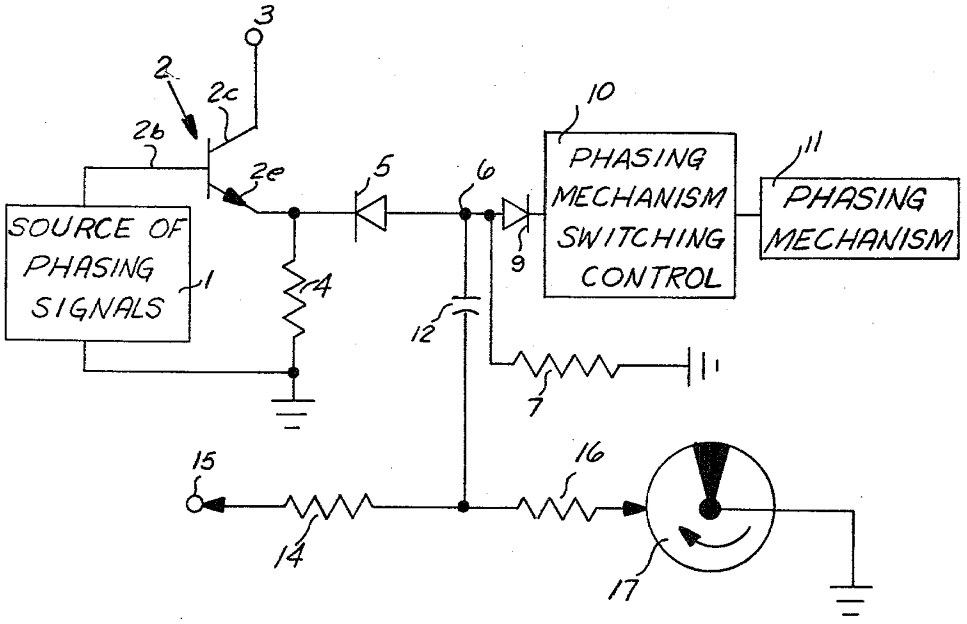
INVENTOR.
JOHN W. SMITH
BY Edward T. Connors United States Patent Office 3,184,546 Patented May 18, 1965

3,184,546
FACSIMILE COINCIDENCE PHASING CONTROL CIRCUIT

John W. Smith, Whitestone, N.Y., assignor to Hogan Faximile Corporation, New York, N.Y.

Filed May 31, 1962, Ser. No. 199,187
7 Claims. (Cl. 178—69.5)

The present invention relates to electric facsimile systems and more particularly to a facsimile coincidence phasing control circuit adapted to control a phasing mechanism for a facsimile recorder.

In electric facsimile systems graphic material such as pictures, drawings, printed or typed material or the like is scanned and the information is converted into electric facsimile signals which are used either locally or remotely to produce a recorded "facsimile" of the original or subject copy.

In a typical facsimile transmitter subject copy is continuously moved past a scanning area where it is illuminated and its reflected image is focussed on a scanner which converts the scanned information into a series of trains of electric video signals. A so-called "backstroke interval" is provided between each train of electric video signals for the transmission of phasing or other signals.

In a typical facsimile recorder means are provided by which an electrolytic recording medium from a supply roll is continuously moved between a fixed linear electrode and a helical electrode which is rotatably carried by a drum. The recording is made by the passage of the electric video signals through the recording medium.

The signal input to the receiver is a series of trains of electric video signals each train representing a line of information across the copy, while the sequential trains of signals represent the information line by line along the length of the scanned copy. Between each train of electric video signals, and during the backstroke interval, a phasing pulse is transmitted which is separated at the receiver to control phasing mechanism. The phasing mechanism is used to properly phase the recorded copy responsive to the transmitted phasing pulses. Proper phasing is accomplished when the received video signal for each line of scan is recorded starting at the left hand margin of the recording medium. The phasing mechanism of the recorder includes a driving means such as a motor and controlled interconnecting means between the driving means and the helix so that the helix can assume a desired angular position with respect to the driving means in order that the recording is made with the scanned line starting at the lefthand margin. A suitable phasing mechanism is described and claimed in my copending patent application titled Facsimile Recorder Phasing Mechanism Serial No. 199,186 filed on even date herewith.

The phasing mechanism is controlled by electric circuitry in which the transmitted phasing pulse is compared with a local generated pulse and if coincidence is had an output pulse is transmitted to the phasing mechanism preventing further operation of the phasing mechanism until such time as the pulses are not in coincidence.

An object of the present invention is to provide a facsimile coincidence phasing control circuit which is simple and economical in manufacture, efficient in operation and durable in use.

Other objects and advantages of the invention will be apparent from the following description and from the accompanying drawing which shows, by way of example, an embodiment of the invention.

In the drawing there is a schematic showing of a wiring diagram for the facsimile coincidence phasing control circuit.

Referring to the drawings there is shown a source of transmitted phasing pulses such as may be separated in a facsimile receiver from a transmitted video signal as is well known in the art. The phasing pulses from the source 1 may be applied to base 2*b* of a NPN transistor 2 also having a collector 2*c* and an emitter 2*e*. The collector 2*c* may be connected to a suitable source of potential 3 such as +10 to 12 volts. The emitter 2*e* is connected through a load resistor 4 to ground. The emitter 2*e* is also connected to the cathode of a diode 5 having its anode connected to junction point 6 of a network. The junction point 6 is connected through a discharge resistor 7 to ground and to the anode of a diode 9 having its cathode connected to the input of a phasing mechanism switching control 10, the output of which is connected to a phasing mechanism 11 such as described and claimed in my said copending patent application titled Facsimile Recorder Phasing Mechanism Serial No. 199,186 filed on even date herewith.

A capacitor 12 has one terminal connected to the junction 6 and its other terminal connected in series with a resistor 14 to a power supply such as a negative potential of −10 volts. A junction of the capacitor 12 and the resistor 14 is connected to a resistor 16 to a keyer switch 17 having its other terminal grounded.

In the operation of the facsimile coincidence phasing control circuit in accordance with the invention a source of phasing signals is applied across the transistor 2 and the load resistor 4 by connecting the source 1 of phasing signals between the base 2*b* and ground. Upon the operation of the transmitter the phasing pulses are thus applied to the cathode of the diode 5.

Meanwhile the capacitor 12 is being charged to a negative potential by the source 15 through the resistor 14. Simultaneously, the keyer switch 17 is being rotated with the helix of the recorder and upon making contact drops the potential to the capacitor causing it to discharge either through the diode 5 and the load resistor 4 to ground or through the discharge resistor 7 to ground. Inasmuch as the load resistor 4 is of the order of one hundredth of the resistance of the discharge resistor 7 the capacitor 12 will tend to discharge through the load resistor 4 and the pulse produced at the junction 6 will be of the order of about one volt as most of the voltage drop will be across the resistor 16. However, in the event the source of phasing signals is producing a pulse across the load resistor 4 at the same time as the capacitor 12 is discharged the potential across the load resistor 4 will be such as to block current from the capacitor 12 thereby forcing it to discharge through the discharge resistor 7 and causing a large pulse of the order of ten volts to be produced at the junction point 6 which is of sufficient magnitude to overcome a threshold of about five volts of the diode 9 and thereby produce a coincidence pulse to the phasing mechanism switching control 10 which is so arranged as is known in the art to cause the phasing mechanism 11 to be rendered inoperative.

In a commercial embodiment of the invention the circuit constants had the following values:

| | |
|---|---|
| Transistor **2** | Texas Instruments TI 484. |
| Power supply **3** | Plus 10 to 12 volts. |
| Resistor **4** | 1K ohms. |
| Diodes **5** and **9** | Sylvania 1N625. |
| Resistor **7** | 100K ohms. |
| Capacitor **12** | .1 mfd. |
| Resistor **14** | 100K ohms. |
| Power supply **15** | Negative 10. volts. |
| Resistor **16** | 10K ohms. |

While the invention has been described and illustrated with reference to a specific embodiment thereof it will be understood that other embodiments may be resorted to without departing from the invention. Therefore, the form of the invention set out above should be considered as illustrative and not as limiting the scope of the following claims.

I claim:

1. A facsimile coincidence phasing control circuit comprising a source of transmitter phasing pulses, a source of local pulses, means for comparing coincidence of the transmitted and local pulses including network junction means, a discharge resistor connected to the network junction, a blocking diode, an input load resistor connected at one end in series with the blocking diode to the junction, means for applying the transmitter pulses across the input load resistor, means for applying the local pulses to the junction, and threshold blocking means connected to the junction and forming an output, whereby at coincidence of the transmitter and local pulses a phasing pulse is produced at the output.

2. A facsimile coincidence phasing control circuit comprising a source of transmitter phasing pulses, a source of local pulses, means for comparing coincidence of the transmitted and local pulses including network junction means, a discharge resistor connected to the network junction, a blocking diode, an input load resistor connected at one end in series with the blocking diode to the junction, the resistance of the input load resistor less in magnitude than the resistance of the discharge resistor, means for applying the transmitter pulses across the input load resistor, means for applying the local pulses to the junction, and threshold blocking means connected to the junction and forming an output, whereby at coincidence of the transmitter and local pulses a phasing pulse is produced at the output.

3. A facsimile coincidence phasing control circuit comprising a source of transmitter phasing pulses, a source of local pulses, means for comparing coincidence of the transmitted and local pulses including network junction means, a discharge resistor connected to the network junction, a blocking diode, an input load resistor connected at one end in series with the blocking diode to the junction, the resistance of the input load resistor less in magnitude than the resistance of the discharge resistor, means for applying the transmitter pulses across the input load resistor, means for applying the local pulses to the junction, and diode threshold blocking means connected to the junction and forming an output, whereby at coincidence of the transmitter and local pulses a phasing pulse is produced at the output.

4. A facsimile coincidence phasing control circuit comprising a source of transmitter phasing pulses, a recorder helix, a keyer switch operative by rotation of the helix and forming a source of local pulses, means for comparing coincidence of the transmitted and local pulses including network junction means, a discharge resistor connected to the network junction, a blocking diode, an input load resistor connected at one end in series with the blocking diode to the junction, the resistance of the input load resistor less in magnitude than the resistance of the discharge resistor, means for applying the transmitter pulses across the input load resistor, means for applying the local pulses to the junction, and diode threshold blocking means connected to the junction and forming an output, whereby at coincidence of the transmitter and local pulses a phasing pulse is produced at the output.

5. A facsimile coincidence phasing control circuit comprising a source of transmitter phasing pulses, a coincidence network including network junction means, a discharge resistor connected to the network junction, a blocking diode, an input load resistor connected at one end in series with the blocking diode to the junction, means for applying the transmitter pulses across the input load resistor, a recorder helix, keyer switch means rotatable with the recorder helix, a capacitor, a source of potential for the capacitor, the keyer switch adapted to periodically discharge the capacitor through the junction thereby providing local pulses, and threshold blocking means connected to the junction and forming an output, whereby at coincidence of the transmitter and local pulses a phasing pulse is produced at the output.

6. A facsimile coincidence phasing control circuit comprising a source of transmitter phasing pulses, a coincidence network including network junction means, a discharge resistor connected between the network junction and ground, a blocking diode, a grounded input load resistor connected at one end in series with the blocking diode to the junction, means for applying the transmitter pulses across the input load resistor, a recorder helix, keyer switch means rotatable with the recorder helix, a capacitor, a grounded source of potential, a power supply resistor connected between the ungrounded side of the source and the capacitor, the keyer switch connected between ground and the capacitor to periodically discharge the capacitor through the junction thereby providing local pulses, and threshold blocking means connected to the junction and forming an output, whereby at coincidence of the transmitter and local pulses a phasing pulse is produced at the output.

7. A facsimile coincidence phasing control circuit comprising a source of transmitter phasing pulses, a network including a junction, a diode including an anode and a cathode, the diode cathode connected to the junction, a load resistor connected between the diode anode and ground, means applying the source of transmitter phasing pulses to the load resistor, a discharge resistor connected from the junction to ground, a capacitor connected from the junction to a source of potential, a keyer switch for periodically grounding the potential side of the capacitor thereby producing a local pulse at the junction, and threshold blocking means connected to the junction and forming an output, the resistance of the load resistor being less than the resistance of the discharge resistor so that in the absence of a transmitted pulse in phase therewith the local pulse is dissipated through the load resistor but at coincidence the local pulse is dissipated through the discharge resistor thereby producing a coincident phasing pulse at the output.

References Cited by the Examiner

UNITED STATES PATENTS 2,722,564 11/55 McFarlane ---------- 178—69.5

DAVID G. REDINBAUGH, *Primary Examiner.*